No. 642,791. Patented Feb. 6, 1900.
J. T. GRAY.
COMPOUND FOR EXTERMINATING BURROWING ANIMALS.
(Application filed May 11, 1899.)
(No Model.)
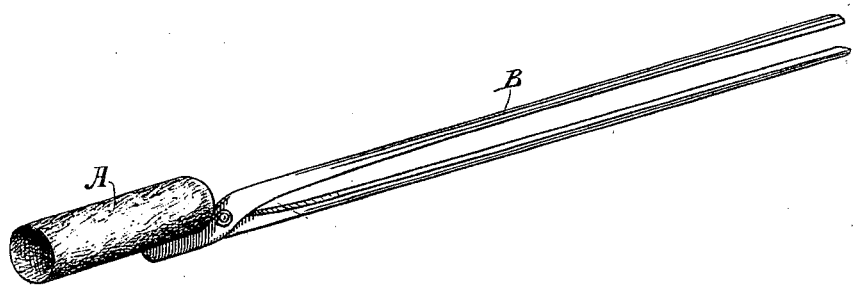

UNITED STATES PATENT OFFICE.

JAMES T. GRAY, OF HOLLISTER, CALIFORNIA.

COMPOUND FOR EXTERMINATING BURROWING ANIMALS.

SPECIFICATION forming part of Letters Patent No. 642,791, dated February 6, 1900.

Application filed May 11, 1899. Serial No. 716,340. (No specimens.)

*To all whom it may concern:*

Be it known that I, JAMES T. GRAY, a citizen of the United States, residing at Hollister, county of San Benito, State of California, have invented an Improvement in Exterminators for Burrowing Animals; and I hereby declare the following to be a full, clear, and exact description of the same.

My invention relates to a compound and means for applying it, whereby burrowing animals like squirrels, gophers, rabbits, &c., may be destroyed in their burrows.

It consists of a compound formed of ingredients, hereinafter described and claimed, which will produce a suffocating vapor or fumes which when disseminated throughout the galleries and passages of burrowing animals will exterminate said animals.

In the preparation of my compound I employ coal-tar, sulphur, and coal-oil or petroleum, either crude or refined, and with these may be combined certain other substances which assist in rendering them more effective. Various proportions of these substances may be employed without materially altering the character or effect; but I have found that the following proportions are very effective in practice: coal-tar, forty pounds; sulphur, twenty pounds, and crude or refined petroleum or coal-oil, three gallons. Although this compound is effective for the purpose, I have found that the addition of certain other ingredients—such as rosin, either powdered or in the form of the oil of rosin, and ground charcoal—are especially effective, the former serving to stiffen up and retain in shape the tubular fibrous substance through which the compound is best applied.

The ingredients of the compound are mixed as follows: First, take coal-tar and mix in the sulphur in a vessel which is afterward closed, and the compound is heated either by a fire, steam heat, if available, or any other desired means, it being preferable to have the fire covered and inclosed, as in a stove, so that there will be no danger of igniting the contents of a vessel. If the rosin or charcoal is to be used with the compound, this is also stirred in at this stage of the proceedings, and the whole mass is brought to a heat about equal to the boiling-point. It is then removed from the fire and the petroleum or coal-oil is stirred in, and the compound is again reheated to the boiling-point. This insures a thorough mixture and permanent union of the ingredients and prevents the separation of the lighter oil from the rest of the mass, which is liable to occur when it is attempted to mix the compound in a cold state and under different conditions.

In order to properly apply this compound, I take burlap or any flexible fibrous material and saturate it in the heated mass, pressing out any surplus that may remain after the dipping. I have found that a very good way to prepare the material is to cut it into small squares of four or five inches dimensions in each direction, then dip these squares into the heated mass, either partially or wholly, or the compound may be brushed upon the material, if preferred. If wholly dipped or saturated, the surplus may be squeezed out by passing the strips between rolls, or if partially dipped the strips may be piled up one on top of the other, and capillary attraction will serve to saturate the remaining undipped portions, so that the strips will all be sufficiently saturated and the surplus material will thus be disposed of. To use this material, these strips are rolled up into small coils.

Referring to the accompanying drawing, in which the figure shows the mode of applying the exterminator, A represents one of said coils of the material, and at the point where it overlaps it may be seized by a long tongs or other suitable implement. The hollow roll A thus formed is then ignited and after the flame is sufficiently started the roll is thrust into the burrow by the aid of the tongs or holder to a considerable distance from the mouth of the burrow. By thus rolling up the saturated material and forming it into a tube an air-space is provided for circulation of air through it and the mass will, after being ignited, burn without being easily put out, which is an advantage over any wad of material through which it might be attempted to apply the compound. The addition of the rosin also stiffens up the fiber of the cloth, burlap, or other material and assists in retaining it in its cylindrical or tubular form and assists in preventing its collapsing within the burrow.

After the tube A has been ignited and inserted the mouth of the burrow is closed by grass, weeds, or other available substance laid lightly over the mouth and a little earth placed lightly upon it without too much force, which would tend to extinguish the flame. After the hole has been thus lightly covered it may be fully and entirely covered with earth without any further danger, and the burning of the roll will create fumes which, being unable to escape through the mouth of the hole, will be forced through the various passages and galleries of the burrow and will drive out or destroy the animals located therein.

The rolls are preferably ignited from the inside, and will thus be less liable to be extinguished in the wind. If for any reason there should be some difficulty in igniting the rolls, they may be freshly wetted with coal-oil or other inflammable substance.

Having thus described my invention, what I claim as new, and desire to secure by Letters Patent, is—

1. A compound formed of coal-tar, sulphur, and petroleum product mixed substantially as herein described.

2. A compound of sulphur, tar and petroleum product mixed and applied to fibrous inflammable material which is afterward formed into tubular rolls, substantially as described.

In witness whereof I have hereunto set my hand.

JAMES T. GRAY.

Witnesses:
S. H. NOURSE,
JESSIE C. BRODIE.